(12) United States Patent
Roberts et al.

(10) Patent No.: US 7,197,553 B2
(45) Date of Patent: Mar. 27, 2007

(54) NETWORK SYSTEM HAVING A VIRTUAL-SERVICE-MODULE

(75) Inventors: David Gary Roberts, Fremont, CA (US); Sanjay Dhawah, Fremont, CA (US); Mahesh Kumar, Fremont, CA (US); Glen William Gibson, San Ramon, CA (US); Bala Sankaranarayanan, Santa Clara, CA (US); Sam Rajarathinam, Alviso, CA (US)

(73) Assignee: Nortel Networks Limited, Quebec (CA)

( * ) Notice: Subject to any disclaimer, the term of this patent is extended or adjusted under 35 U.S.C. 154(b) by 449 days.

(21) Appl. No.: 10/126,300

(22) Filed: Apr. 19, 2002

(65) Prior Publication Data

US 2003/0200295 A1 Oct. 23, 2003

(51) Int. Cl.
*G06F 15/173* (2006.01)
*G06F 15/16* (2006.01)

(52) U.S. Cl. .............. 709/223; 709/218; 709/249
(58) Field of Classification Search .............. 709/203, 709/209, 219, 228, 229, 223
See application file for complete search history.

(56) References Cited

U.S. PATENT DOCUMENTS

| | | | |
|---|---|---|---|
| 5,051,987 A | 9/1991 | Conlon | |
| 5,481,735 A | 1/1996 | Mortensen et al. | |
| 5,526,414 A | 6/1996 | Bédard et al. | |
| 5,550,816 A | 8/1996 | Hardwick et al. | |
| 5,577,028 A | 11/1996 | Chugo et al. | |
| 5,583,862 A | 12/1996 | Callon | |
| 5,592,622 A | 1/1997 | Isfeld et al. | |
| 5,598,410 A | 1/1997 | Stone | |
| 5,636,371 A | 6/1997 | Yu | |
| 5,684,800 A | 11/1997 | Dobbins et al. | |
| 5,764,736 A | 6/1998 | Shachar et al. | |
| 5,781,624 A | 7/1998 | Mitra et al. | |
| 5,805,587 A | 9/1998 | Norris et al. | |
| 5,809,025 A | 9/1998 | Timbs | |
| 5,852,607 A | 12/1998 | Chin | |
| 5,917,899 A * | 6/1999 | Moss et al. ............ | 379/221.08 |
| 5,918,074 A | 6/1999 | Wright et al. | |
| 6,041,058 A | 3/2000 | Flanders et al. | |

(Continued)

OTHER PUBLICATIONS

Inkra Networks, "New Data Center Architecture from Inkra Networks Enables Dedicated Services with Shared Economics," Press Release, Feb. 19, 2002, pp. 1-4, http.//www.inkra.com/news_events/press/pr2002-02-19C.html.

(Continued)

*Primary Examiner*—Ario Etienne
*Assistant Examiner*—Sargon N. Nano
(74) *Attorney, Agent, or Firm*—Querin & Rodriguez, LLP

(57) ABSTRACT

A method, apparatus, and system in which a network system includes a virtual graph composed of a plurality individual networks. A first individual network is associated with a first user. The first individual network includes a plurality of service modules modeled to be representing a first set of network elements. The second individual network is associated with a second user. The second individual network includes a plurality of service modules modeled to be representing a second set of network elements. The second set of network element differs in the type of network elements included in the second individual network and the topological order of the network elements in the second individual network than the first set of network elements.

20 Claims, 10 Drawing Sheets

U.S. PATENT DOCUMENTS

| | | | |
|---|---|---|---|
| 6,046,979 A | 4/2000 | Bauman | |
| 6,047,320 A | 4/2000 | Tezuka et al. | |
| 6,047,330 A | 4/2000 | Stracke, Jr. | |
| 6,055,618 A | 4/2000 | Thorson | |
| 6,069,895 A | 5/2000 | Ayandeh | |
| 6,085,238 A | 7/2000 | Yuasa et al. | |
| 6,092,178 A * | 7/2000 | Jindal et al. | 712/27 |
| 6,101,181 A | 8/2000 | Passint et al. | |
| 6,104,699 A | 8/2000 | Holender et al. | |
| 6,104,962 A | 8/2000 | Sastry | |
| 6,108,689 A | 8/2000 | Fagen et al. | |
| 6,172,990 B1 | 1/2001 | Deb et al. | |
| 6,178,183 B1 | 1/2001 | Buskirk, Jr. | |
| 6,178,453 B1 | 1/2001 | Mattaway et al. | |
| 6,185,213 B1 | 2/2001 | Katsube et al. | |
| 6,212,560 B1 | 4/2001 | Fairchild | |
| 6,377,571 B1 | 4/2002 | Tai | |
| 6,665,701 B1 * | 12/2003 | Combs et al. | 99/551 |
| 6,741,693 B1 * | 5/2004 | Madoch et al. | 379/220.01 |
| 6,766,348 B1 * | 7/2004 | Combs et al. | 718/104 |
| 2001/0037397 A1 | 11/2001 | Boucher et al. | |
| 2002/0055989 A1 * | 5/2002 | Stringer-Calvert et al. | 709/220 |
| 2002/0069369 A1 | 6/2002 | Tremain | |
| 2003/0179775 A1 * | 9/2003 | Carolan et al. | 370/469 |

OTHER PUBLICATIONS

Inkra Networks, "Inkra Hardwall: A Technology Overview," Feb. 2002, pp. 1-7, Fremont, CA, USA.

Inkra Networks, "Inkra 4000 Virtual Service Switch Architecture," Jul. 18, 2002, pp. 3-12, Inkra Networks Corp., Fremont, CA, USA.

Inkra Networks, "Service Providers Bullish on Inkra Networks' New Data Center Architecture," Press Release, Feb. 19, 2002, pp. 1-2, http.//www.inkra.com/news_events, Inkra Networks Corp., Fremont, CA, USA.

Inkra Networks, "New Data Center Architecture Scales Multi-Tier Enterprise Applications While Slashing Data Center Cost and Complexity" Press Release, Feb. 19, 2002, pp. 1-2, http.//www.inkra.com/news_events.

* cited by examiner

NETWORK SYSTEM HAVING A VIRTUAL-SERVICE-MODULE

NOTICE OF COPYRIGHT

A portion of the disclosure of this patent document contains material that is subject to copyright protection. The copyright owner has no objection to the facsimile reproduction by anyone of the software engines and modules, as they appears in the Patent and Trademark Office Patent file or records, but otherwise reserves all copyright rights whatsoever.

FIELD OF THE INVENTION

This invention generally relates to a network system. More particularly an aspect of this invention relates to a network system employing one or more Virtual-Service-Modules.

BACKGROUND OF THE INVENTION

A typical standard networking system implemented single-function, fixed functionality. The first generation of virtualized systems offers per-customer functionality, but the functionality is still fixed. These limitations lead to several drawbacks. Customers may judge service providers based on service availability. Customers may perceive any downtime as a problem with the service provider and may consider switching providers. Service providers want to add service products to their offerings to generate more revenue and increase margins with higher-value offerings. Some of today's systems require downtime associated with upgrades. This is the case because their systems package all functionality into a single runtime image. It is simpler to design and test a system when all functionality is packaged and released in a single unit. In some cases, the service provider has to minimize downtime by building a redundant topology and taking down one system while the backup system handles service. This is non-optimal because it forces the service provider to purchase redundant hardware and design complex configurations. To achieve economies of scale and lower capital expenditures, service providers are installing systems that service multiple customers on a single system. Rather than dedicating hardware to each individual customer, the service provider amortizes that capital expense across many customers, lowering the average cost. These service providers typically schedule downtime with their customers for routine maintenance. This scheduling is more difficult when multiple customers are configured to utilize the same system.

In addition, typical networking systems may offer fixed functionality that is composed in a fixed manner. For instance, processing is usually data link layer L2 followed by network layer L3, or secure socket layer (SSL) acceleration followed by load balancing. Typically, networking systems implement fixed functionality with a monolithic version of software. Those systems that offer Virtual loading typically use a simple link-time configuration strategy or simple Virtual loading at start time, but not thereafter. Thus, you may get to choose what functionality you want to run at startup time, but you cannot change it thereafter. Typically, prior systems have had disadvantages such as they require a reboot when they are upgraded. This causes downtime. As a result, some conventional systems lack the ability to configure functionality in an arbitrary manner using an arbitrary topology, to add new functionality to a running system without causing downtime, or to upgrade a portion of functionality to a new revision.

Furthermore, in data centers, from time to time they have to upgrade the software running on a packet processing system or change the network topology or upgrade the hardware. Any upgrade of software or hardware disrupts the service availability. Such upgrades are normally done during the maintenance hours in which the service is not available to the customers. Alternatively, the service network is duplicated so that the service is available on one of networks always. In the first approach, service is disrupted. In the second approach, redundant network must be setup and maintained carefully.

Therefore, a better solution is highly desirable to be able to compose, manage, change, or upgrade a topology of a network system.

SUMMARY OF THE INVENTION

A method, apparatus, and system in which a network system includes a virtual graph composed of a plurality individual networks. A first individual network is associated with a first user. The first individual network includes a plurality of service modules modeled to be representing a first set of network elements. The second individual network is associated with a second user. The second individual network includes a plurality of service modules modeled to be representing a second set of network elements. The second set of network element differs in the type of network elements included in the second individual network and the topological order of the network elements in the second individual network than the first set of network elements.

BRIEF DESCRIPTION OF THE DRAWINGS

The drawings refer to the invention in which.

Figure 1:
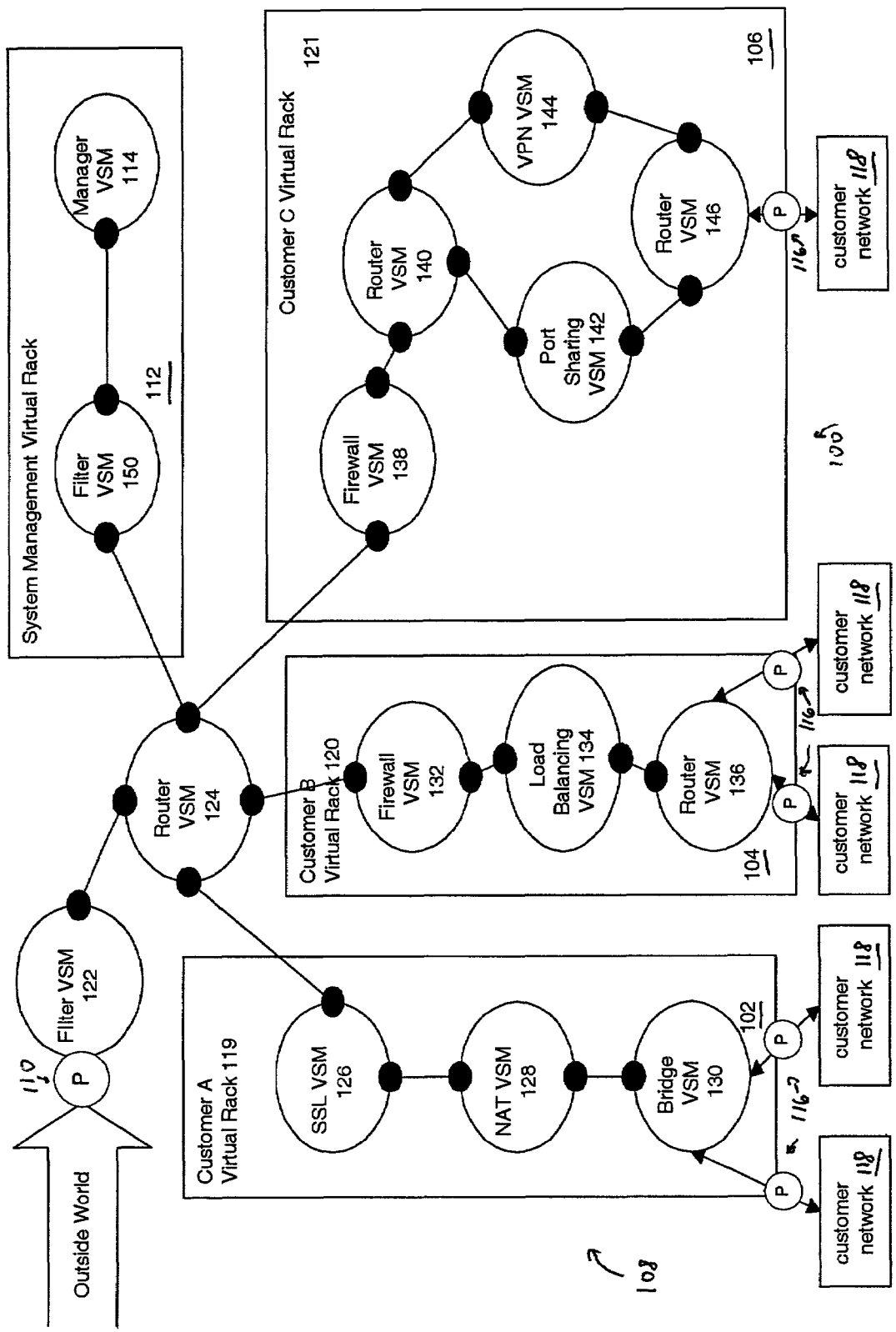
FIG. 1 illustrates an embodiment of a network system that includes multiple individual networks to serve the unique network requirements of multiple users.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of networks, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as first driver, may be made. However, the specific numeric reference should not be interpreted as a literal sequential order but rather interpreted that the first Virtual-Service-Module is different than a second Virtual-Service-Module. Thus, the specific details set forth are merely exemplary. The specific details may be varied from and still be contemplated to be within the spirit and scope of the present invention. The term packet may be a block of data used for transmission in packet switched systems. The terms frame, packet and datagram are often used synonymously.

In general, a method, apparatus, and system are described in which a network system includes a virtual graph composed of a plurality individual networks. A first individual network is associated with a first user. The first individual network includes a plurality of service modules modeled to be representing a first set of network elements. The second individual network is associated with a second user. The second individual network includes a plurality of service modules modeled to be representing a second set of network elements. The second set of network element differs in the type of network elements included in the second individual network and the topological order of the network elements in the second individual network than the first set of network elements.

FIG. 1 illustrates an embodiment of a network system that includes multiple individual networks composed of one or more Virtual-Service-Modules in order to serve the unique network requirements of multiple users. The multiple individual networks 102, 104, 106 compile into the virtual graph 108 and resources are managed for each individual network in the system according to the user assignment. The network system 100 consists of a first port 110 to the outside world, such as the Internet, a first individual network 102 that includes a first virtual rack 119 housing customer A's network elements, a second individual network 104 that includes a second virtual rack 120 housing customer B's network elements, a third individual network 106 that includes a third virtual rack 121 housing customer C's network elements, a virtual address space assigned to a system management virtual rack 112 housing a management module 114 of the network system, and multiple input output ports 116 connecting the virtual graph 108 to each customer's network 118. In an embodiment, virtual graph houses the topologies of all the individual networks 102, 104, 106 but keeps each individual network logically and physically distinct from each other.

In an embodiment, the virtual graph 100 assigns a separate virtual address space to each individual network 102, 104, 106 within a global domain housing all of the virtual address space. In an embodiment, a virtual rack 119–121 is assigned to each user. The virtual rack 119–121 consists of a virtual address space and hardware resources, such as processing power, bandwidth, and memory, dedicated to that virtual address space. The unique address space and dedicated hardware resources of the virtual rack 119–121 makes each individual network 102, 104, 106 logically and physically distinct from another individual network 102,104,106. In an embodiment, a virtual rack 119–121 is a logical receptacle for multiple network-resident application services, such as Virtual-Service-Modules, and is analogous to a physical rack of network appliances.

The virtual network topology models the packet-processing functionality in the system as an abstract virtual graph 108 of connected Virtual-Service-Module (VSM) 122–150 nodes. Each Virtual-Service-Module 122–150 in the system is modeled roughly along the lines of individual network elements in the real world. For instance, a Virtual-Service-Module 122–150 may implement functionality approximately that of a standalone IP router, Ethernet switch, a virtual private network, filter/firewall, load balancer, bridge, network address translator, etc. These Virtual-Service-Module 122–150 nodes are then composed in the virtual graph 108 similar to the way they would be in the real world.

Note, the composition and topology of the Virtual-Service-Modules 122–150 modeled to represent network elements may be arbitrarily assembled based upon a particular customer's desires. For example, customer B's network 104 is composed of different network elements than included in the customer C's network 106. Physical ports 110, 116 on a network switch are attached to the virtual graph 108 at various points and allow the internal virtual system to be coupled to components external to the virtual graph 108.

The virtual graph 108 may grow to be very large and come to replace most or all of a typical network data center. The size of the virtual graph 108 may be limited by memory capacity and processing power of the one or more host machines. In an embodiment, the virtual graph 108 is hosted on a single computing machine.

As noted, the network system 100 may have variable functionality representing discrete "services". Each Virtual-Service-Module 122–150 models a network element having one or more functions. In an embodiment, each Virtual-Service-Module 122–150 modeled to represent a network element provides a discrete service.

Each Virtual-Service-Module 122–150 may be composed into the arbitrary topology where packet processing is governed by the configured virtual graph 108 of network services. As each related packet flow is introduced to the system, the support framework software walks the virtual graph of Virtual-Service-Modules in an individual network topology, such as firewall Virtual-Service-Module 132, load balancing Virtual-Service-Module 134, and router Virtual-Service-Module 136, to create a sequential node list for that related packet flow.

As noted, different individual networks 102, 104, 106 have reserved resources and the exhaustion of resources for one customer does not affect the service levels seen by a second customer. The physical layer performs resource management at the hardware level to ensure that each individual network 102, 104, 106 receives a guaranteed range of the processing and memory resources available in the system and that each individual network 102, 104, 106 cannot interfere with one another. The unique address space and dedicated physical resources assigned to the virtual rack forms a boundary around the Virtual-Service-Modules 122–150 in each individual network 102, 104, 106. In an embodiment, the physical layer employs HardWall technology created by Inkra Networks, Inc. located in Fremont, Calif. to manage consumption of system resources and to ensure that a disruptive event occurring in one virtual rack does not affect other virtual racks in the same system. Thus, each individual network 102, 104, 106 has processing and memory resources dedicated to that service topology and exhaustion of these dedicated resources for the first individual network is independent from service levels provided to a second individual network.

For example, FIG. 1 shows three separate virtual racks 119–121, each populated with a number of Virtual-Service-Modules 122–150. The physical layer contains resource management circuit, such as a virtual rack processor employing a token bucket algorithm to ensure that resources intensive actions, such as a Denial of Service attack, launched against virtual rack A 119 does not cause any decrease in performance in virtual rack B 120 beyond guaranteed levels. Virtual rack A 119 can consume only its specified share of resources; past that, the resource management circuit limits any further consumption to ensure that virtual rack B 120 continues to operate normally. Because multiple Virtual-Service-Modules 122–150 can be installed into a virtual rack 119–121, the resource management circuit performs resource management for the entire group of Virtual-Service-Modules within the virtual rack boundaries. This methodology reduces configuration complexity dramatically, because the user is not forced to manually configure resource parameters for each individual Virtual-Service-Module.

In one embodiment, a user may specify or configure the virtual rack 119–121 through a user interface of the management virtual rack 112.

The Virtual-Service-Modules 122–150 in each individual network 102, 104, 106 may be arranged in an arbitrary sequential order. A Virtual-Service-Module modeled to represent a firewall 132 may be placed before or after a Virtual-Service-Module modeled to represent a load balancer 134. Further, customer A's individual network 102 may be composed of different network elements, such as a secure sockets layer 126, a network address translator 128, and a bridge 130, than included in the topology of customer B's individual network 104. Thus, each customer in the virtual graph 108 may tailor the arrangement and functionality of the Virtual-Service-Modules in the individual network topology 102, 104, 106 associated with that customer to the unique requirements needed by that customer. Further, a customer/user can manage a virtual rack 119–121 populated with one or more Virtual-Service-Module instances 122–150 as a single unit within the network system 100.

Figure 2:
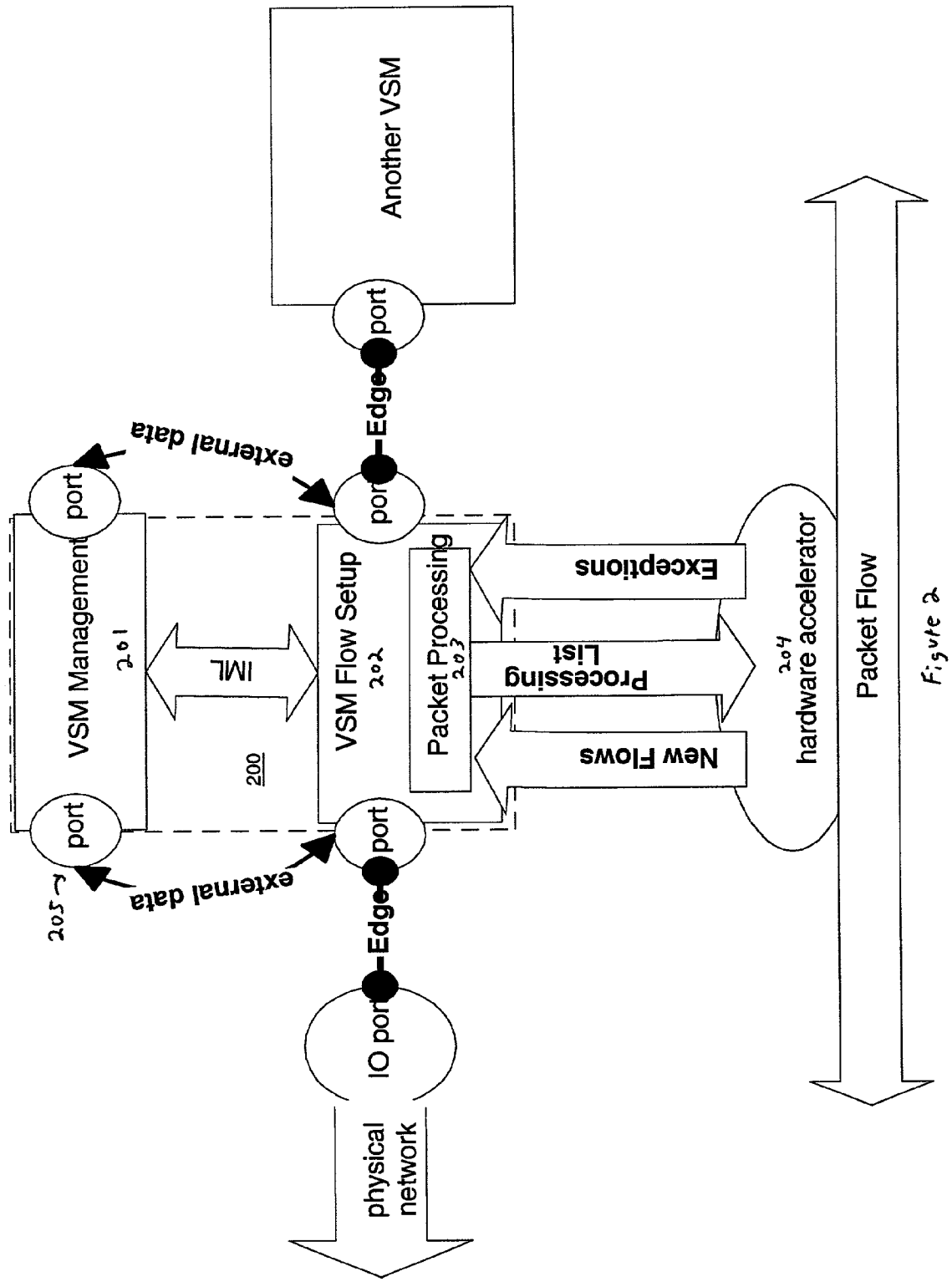
FIG. 2 illustrates an embodiment of an architecture of a Virtual-Service-Module modeled to represent a network element that performs one or more functions to process a packet in a network system.

FIG. 2 illustrates an embodiment of an architecture of a Virtual-Service-Module modeled to represent a network element that performs one or more functions to process a packet in a network system. The architecture of an instance of a Virtual-Service-Module 200 may be composed of multiple cooperating parts. In this way, a Virtual-Service-Module 200 is actually a high-level abstraction composed of multiple sub-parts. The sub-components include a Management component 201, a Flow setup component 202, and a Packet-processing component 203. Each Virtual-Service-Module instance 200 also may have ports that describe its relation to other components and have interfaces to communicate with components external to the virtual network system. The ports are used by both the management component 201 and the flow setup component 202.

The management component 201 directs interfacing with the various management interfaces common to the components internal to the virtual system. The management component 201 also maintains any global information required. The management component 201 gathers information by communicating with external entities such as routers and authentication authorities. The management component 201 may dynamically configure the virtual service module 200.

The flow setup component 202 performs initial packet-processing, determining the packet path through the virtual network graph, and building an action list for the flow. Flow may be a particular stream of related packets. For example, the stream of data a server sends to a client over a particular TCP connection is a flow of related packets.

The packet-processing component 203 is an abstract piece of the Virtual-Service-Module 200. The packet-processing component 203 may contain an action list of standard processing primitive instructions programmed into a hardware accelerator application specific integrated circuit. A Virtual-Service-Module that requires packet processing beyond what the standard primitive instructions in the packet-processing component 203 can accomplish would continue to process the packets in the flow set-up processing component 202. A Virtual-Service-Module that starts each related packet flow as this type of extended flow setup can bind an action list at any time, but in some cases the Virtual-Service-Module processes the entire related packet flow without ever switching to hardware assist.

In an embodiment, each Virtual-Service-Module 200 is a self-contained module of data and its associated processing software that has an archive file containing both executable code as well as metadata that integrates the service module with the network system. The executable code includes instructions to install and remove that instance of the Virtual-Service-Module 200. Further, the executable code includes instructions to configure that instance of the Virtual-Service-Module 200 with configuration information. As noted, each Virtual-Service-Module 200 may contain data and its associated processing software to model a discrete network element such as a firewall, a filter, a load balancer, a router, etc.

In an embodiment, a Virtual-Service-Module 200 belongs to an object class in which one or more instances of each Virtual-Service-Module 200 may exist. Objects may be independent program modules written in object-oriented programming languages. Objects are software components structured to plug into and work with each other at runtime without any prior liking or precompilation as a group. One or more instances of particular type of Virtual-Service-Module 200 may be created.

In an alternative embodiment, each VSM component may be contained in a single container application, just as long as the service module is modeled to represent a network element.

Referring to FIG. 1, For example, the class of Virtual-Service-Modules modeled to represent firewalls 132, 138 may have multiple instances of that Virtual-Service-Module plugged into multiple customers' virtual racks 120, 121 throughout the virtual graph 108. The classes of Virtual-Service-Modules modeled to represent network elements are created in hierarchies, and inheritance allows the knowledge in one class in a layer higher in the hierarchy to be passed down to another class lower in the hierarchy, such as an instance of a VSM firewall.

Referring to FIG. 2, in an embodiment, Virtual-Service-Modules 200 may be packaged in separate binary images. The image contains an archive file of both executable code as well as metadata that integrates the Virtual-Service-Module 200 with the system. The meta data includes information that describes the various configuration parameters supported by the Virtual-Service-Module, versioning information, resources required, dependency information, and any specific commands required to configure the module through the command-line interface (CLI). Using this information, the network system can easily integrate the Virtual-Service-Module 200 without the user known what functionality is "built-in" to the base system and what has been added later. In an embodiment, extendable markup language (XML) may be used to format the meta data.

In an embodiment, even after a Virtual-Service-Module 200 has bound an action list, the flow set-up component 202 can handle exception conditions reported from the action list in the packet processing component 203 in order to handle the more complicated processing sometimes required for infrequent events. In an embodiment, an action list may be a list of processing primitive instructions that a Virtual-Service-Module wants applied to each packet in a given related packet flow. Processing primitive instructions may be a single, primitive instruction packet transformation operation. For example, decrementing the IP TTL field or recomputing the IP checksum field are each processing primitive instructions. A combined action list is the concatenation of each Virtual-Service-Module's action list for all the nodes in a given sequential node list. A common action list is a global action list applied to all arriving packets. An optimized action list is the combined action list after it has been optimized.

In an embodiment, a Virtual-Service-Module 200 may have three types of addressing perspectives.

Referring to FIG. 1, the most familiar addressing perspective is the router-like Virtual-Service-Module 124, 136 that performs "normal" routing functions. The other two Virtual-Service-Module addressing perspectives can be restricted to two ports, which means that no routing decisions will be required. These two addressing perspectives are the addressable bump and the anonymous bump that make forwarding decisions. For example, the firewall Virtual-Service-Module 132, 138 can be an anonymous bump that decides which packets to drop, but once a decision to forward the packet has been made, there is no choice as to which port the packet should be sent. An addressable bump may be, for example, a Virtual Private Network.

Figure 3:
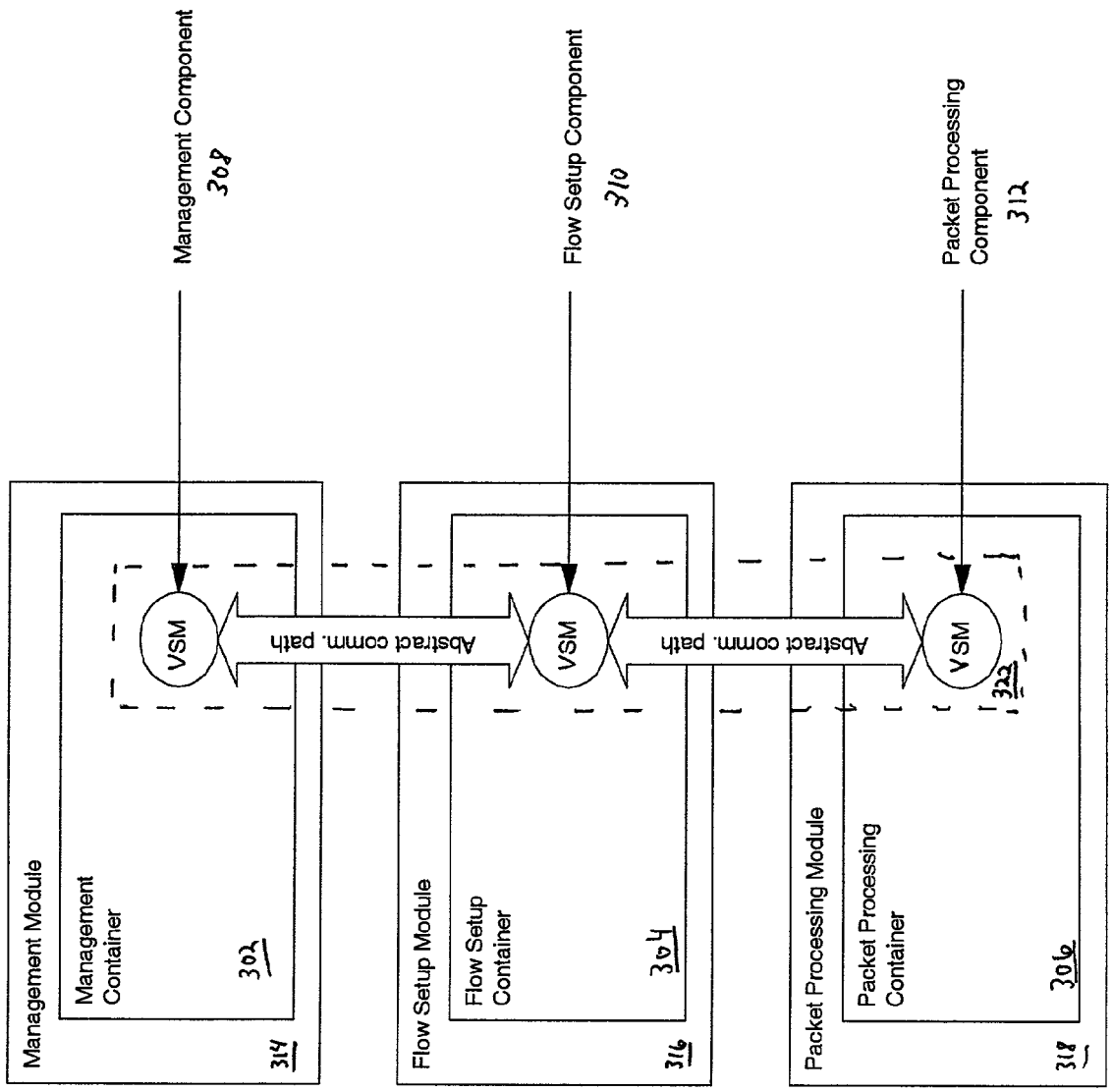
FIG. 3 illustrates an embodiment of a Virtual-Service-Module container architecture and the Virtual-Service-Module mapping to the physical layer.

FIG. 3 illustrates an embodiment of a Virtual-Service-Module container architecture and the Virtual-Service-Module mapping to the physical layer. In an embodiment, the container program consists of two or more sub-programs. Each subprogram is programmed for a specific function such as a management container 302, a flow setup container 304, and a packet-processing container 306. The container architecture may use the three different types of containers 302, 304, 306 to manage the three individual components of a Virtual-Service-Module, the management component 308, a flow setup component 310, and a packet-processing component 312. In an embodiment, the management container 302, the flow setup container 304, and the packet-processing container 306 may be included as portions of the operating system software. The management component 308 may embed in the management container 302. The flow setup component 310 may embed in the flow setup container 304. The packet-processing component 312 may embed in the packet processing container 306.

The management container 308 provides various common management interfaces such as SNMP, web, and CLI, and allows the Virtual-Service-Module to interact with that functionality. The flow setup container 304 wraps the Virtual-Service-Module flow setup component 310 and provides for the dispatching of new related packet flows to flow setup components. The flow setup container 304 provides the creation and optimization of action lists. The packet-processing container 306 manages the optimized combined processing list transferred from the flow setup module 310 on a per-flow basis.

A Virtual-Service-Module, such as Virtual-Service-Module 322, may interact with another Virtual-Service-Module though the container program. In an embodiment, no Virtual-Service-Module contains a direct object reference to another Virtual-Service-Module. This makes it much easier to alter the virtual network graph and upgrade Virtual-Service-Modules without having to worry about other Virtual-Service-Modules holding stale object references. Therefore, Virtual-Service-Modules can operate in total isolation without having to worry about what other Virtual-Service-Modules may exist in the chain and the various lifecycle changes those other Virtual-Service-Modules may be going through.

In an embodiment, the management container 302, flow setup container 304, and packet-processing container 306 implement various portions of a Virtual-Service-Module's Application Program Interface. The management container 302 provides API functions to install and remove a Virtual-Service-Module, to configure a Virtual-Service-Module with both box-wide and content-provider-specific configuration information, and to manage a Virtual-Service-Module.

The flow setup container 304 provides API functions to dispatch new related packet flows, build and manage the creation of optimized processing lists, and the packet flow transfers to the packet-processing module, manipulate packet contents, and manipulate related packet flow state.

The packet-processing container 306 performs packet processing on the fast path and resides in the packet-processing physical implementation. The packet-processing container provides some of the services of the flow setup container, but eliminates most of the functions that deal with high-level issues such as Virtual-Service-Module configuration and lifecycle management. The packet-processing container 306 provides functions to manipulate packet contents, manipulate related packet flow state, and inform the flow setup container of flow termination, which is then passed on to the appropriate Virtual-Service-Module flow setup component 310.

In an embodiment, the management component 308, flow setup component 310, and packet-processing component 312 of the Virtual-Service-Module 322 may be embedded or linked into the container program. These components of the VSM 308, 310, 312 can be linked instead of embedded, in which case the container application does not physically hold the component of the VSM, but provides a pointer to it. If a change is made to a linked component of the VSM, all the documents that contain the same link are automatically updated the next time you open them. If these components 308, 310, 312 are embedded, then the container that contains a copy of that component. Changes made to that component of the VSM affect only the container program that contains that instance of the component. If a component of the VSM is linked, the document contains a pointer to the original file. When you change a linked component, you are changing the original, and all the programs that link to that component are automatically updated. The container program may provide common functions such as security and transaction support and delivers a consistent interface to the applications regardless of the type of server. The ultimate goal of objects is that it should not matter which source language they were programmed in or which computer on the network they are running in. Virtual-Service-Modules interoperate through the messages passed between the container program.

Each of the Virtual-Service-Module components 308, 310, 312 may be mapped to a different physical circuit board 314, 316, 318. The physical layer of the virtual network system may have several types of circuit modules such as a Management module 314, a service processing module that includes a Flow processing module 316 as well as a packet processing module 318, and an I/O module. The management module 314 includes the switch fabric hardware. The switch fabric hardware consists of a data-passing board in the chassis. Each flow set up module 316 (FPM) may contain one or more flow processing engines. Each flow processing engine may include a General Purpose Processor and an application specific integrated circuit to process packeted information such as a packet-processing hardware accelerator. Each packet processing module 318 may contain one or more flow processing engines. Each flow processing engine is an addressable end point on the data passing hardware connecting board in the chassis. The input-output (I/O) module supports one or more external I/O ports via one or more I/O engines.

The management component 308 of the Virtual-Service-Module can map to and run on the management module 314. The flow setup component 310 maps to and runs on a General-Purpose-Processor on one of the Flow-Processing-Engines. Packet processing may handled in the packet-processing hardware accelerator, with special cases handled via exceptions passed to the General-Purpose-Processor.

Figure 4:
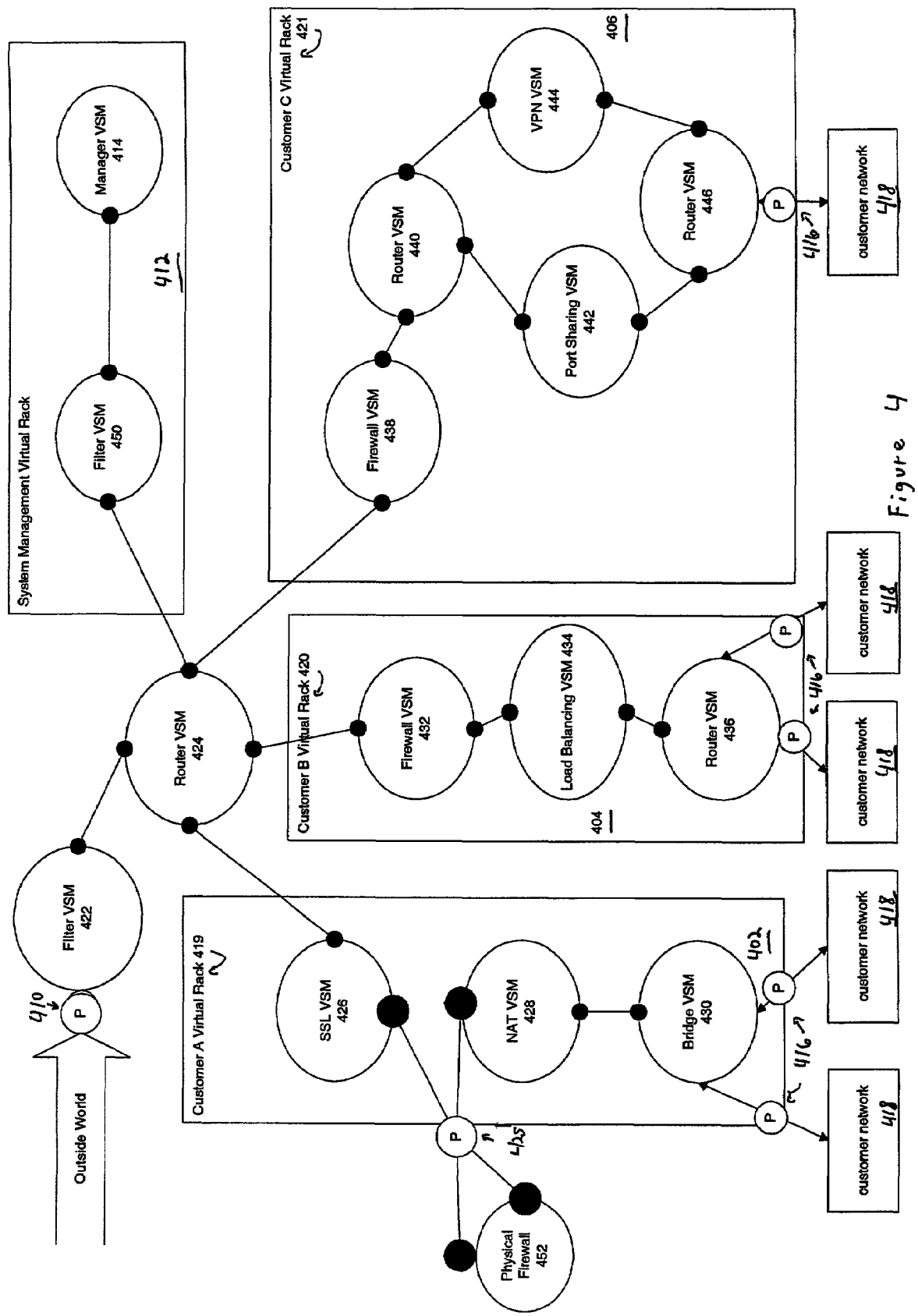
FIG. 4 illustrates an embodiment of an individual network having a topology composed of virtual network elements and physical network elements.

FIG. 4 illustrates an embodiment of an individual network having a topology composed of virtual network elements and physical network elements. The first individual network 402 includes a virtual rack 419 housing customer A's virtual network elements. The virtual rack 419 couples via a port 416 to the customer A's network 418. Also, the virtual rack 419 couples via a second port 425 to a physical network element, such as a firewall 452. An SSL Virtual-Service-Module 426 of the individual network associated with customer A 402 receives packets from the system router Virtual-Service-Module 424. The SSL Virtual-Service-Module 426 forwards the packets to the physical firewall 452 via the second port 425. The physical firewall 452 forwards the packets via the second port 425 to a NAT Virtual-Service-Module 428. The NAT Virtual-Service-Module 428 routes the packets to the bridge Virtual-Service-Module 430. The packets exit the topology of the individual network associated with customer A 402 to the customer's network 418 via multiple ports 416.

In an embodiment, the physical layer contains one or more virtual rack processors. Each virtual rack processor manages the flow of data through the physical layer, allocates resources for each virtual rack 419, and performs high-speed packet processing to implement a particular service. Because the virtual rack 419 uses hardware-based resource management, the virtual rack 419 is more efficient, accurate, and secure than software-based schemes. The virtual rack processor subsystem's activities can be divided into three main categories, Queuing and high-speed processing, Managing general processing resources, and Dealing with the integrity and security of the virtual rack.

In an embodiment, each virtual rack processor assigns multiple queues to each virtual rack 419 in the system. The virtual rack processor services these queues using a token bucket algorithm that ensures that each virtual rack receives its share of the VRP processing resources. The virtual rack processor manages the virtual rack queues in a very large memory area with large buffering capability. By allocating multiple queues per virtual rack, the virtual rack processor ensures that no one virtual rack 419 is able to consume all the available buffer memory at the expense of a second virtual rack 420. The token bucket logic assures that every virtual rack has fair access to the virtual rack processor processing unit.

As noted, if the virtual rack processor decides that a particular packet requires extensive high level processing, it forwards the packet to the general processing block for further attention and moves on to processing the next packet in its queues. Between the virtual rack processor and the general processing block, the virtual rack processor implements a second set of queuing logic. As with the first set of queues, each virtual rack 419–421 in the system is assigned queues in the second set. The virtual rack processor manages this second set of queues and forwards packets to the general processing block as required. This keeps the general processing block fed, and delivers the highest possible throughput. The virtual rack processor subsystem schedules the next packet for the general processing block to ensure that processing resources are distributed according to physical layer resource allocations. In this way, no one virtual rack 419–421 can monopolize processing resources at the expense of the others.

The virtual rack processor subsystem allocates a memory area for each virtual rack 419–421 in the system. The memory area stores packets and service state information associated with the particular virtual rack, such as virtual rack A 419. The system monitors each area closely for resource consumption. If a particular virtual rack, such as virtual rack A 419, encroaches on a physical layer memory allocation limit, it is not allowed to expand further at the expense of other virtual racks. This behavior ensures that no one virtual rack 419–421 can monopolize memory resources at the expense of the others.

The physical layer uses a hardware memory management unit (MMU) to create a protection domain for each virtual rack 419–421. When a service crashes, the protection domain isolates the impact to the particular virtual rack 419–421 where the service is located. When the system detects a crash, the protection domain associated with the virtual rack 419–421 is flushed, and the virtual rack 419–421 is automatically restarted. In this way, the system contains service faults to the virtual rack 419–421 where they originate, preventing them from propagating to other virtual racks 419–421 or affecting their processing.

When working on a packet, the processing block first enters the protection domain associated with the virtual rack 419–421 to which the packet belongs. While in this context, the processing block can only access memory associated with the virtual rack 419–421, assuring the security of the system. Any attempt to access memory resources outside the protection domain is treated as a service crash-in which case the protection domain is flushed and the virtual rack 419–421 is restarted.

As noted above, each Virtual-Service-Module 424, 426, 428, 430 may be dynamically loaded or unloaded through a user interface of the management virtual rack 412. Multiple instances of the Virtual-Service-Modules may be loaded simultaneously, such as router Virtual-Service-Modules 424 and 436. Further, multiple instances of Virtual-Service-Modules may contain different versions. For example, router Virtual-Service-Module 424 may have different version than the router Virtual-Service-Module 436. Each Virtual-Service-Module can be changed or upgraded individually without disrupting other services of the other Virtual-Service-Modules.

Figure 5A:
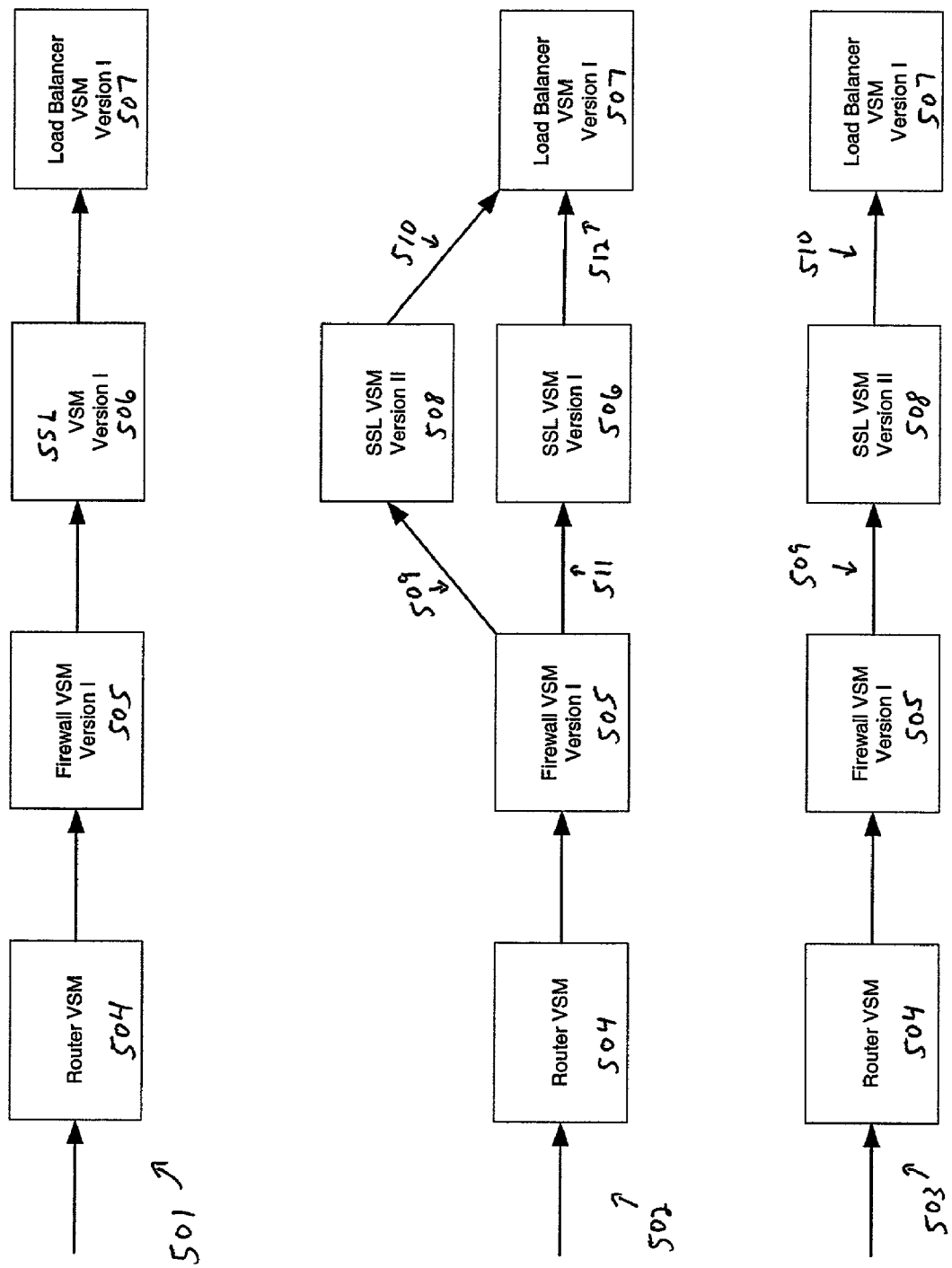
FIG. 5A shows an exemplary block diagram illustrating an upgrade of a Virtual-Service-Module according to an embodiment of the invention.

FIG. 5A shows an exemplary block diagram illustrating an upgrade of a Virtual-Service-Module according to an embodiment of the invention. Referring to FIG. 5A, in one embodiment, an initial configuration 501 of a topology processes a data flow through router Virtual-Service-Module 504, a firewall Virtual-Service-Module 505, a secure socket layer (SSL) Virtual-Service-Module version I 506, and a load balancer Virtual-Service-Module 507. When an upgrade request of SSL Virtual-Service-Module is received (e.g., through a user interface of the management virtual rack), another instance of SSL Virtual-Service-Module version II 508 is launched. Once the SSL Virtual-Service-Module version II 508 is launched, the system connect the SSL Virtual-Service-Module 508 to the firewall Virtual-Service-Module 505 through the edge 509 and to the load balancer Virtual-Service-Module 507 through the edge 510. Thus, the SSL Virtual-Service-Module version II 508 and the SSL Virtual-Service-Module version I 506 are ruing in parallel, as shown in configuration 502.

The system then directs any new flow data to the newly executed SSL Virtual-Service-Module version II 508. The SSL Virtual-Service-Module 508 processes the new data flow and transmit the data to the load balancer Virtual-Service-Module 507 thereafter. At the mean while, the system continue direct the existing data flow to the SSL Virtual-Service-Module version I 506. This parallel processing continues until certain conditions are satisfied. In one embodiment, the condition may be a pre-specified amount data of existing flow waiting for processing. In an alternative embodiment, the condition may be a pre-specified period of time. Anytime before this condition is reached, the upgrade can be aborted instantaneously through the user interface of the management virtual rack.

Once the conditions are satisfied, the system directs all of the traffics to the new SSL Virtual-Service-Module 508. Once the SSL Virtual-Service-Module 508 stabilizes, the system disconnects the edges 511 and 512 between the SSL Virtual-Service-Module 506 and the firewall Virtual-Service-Module 505 and load balancer Virtual-Service-Module 507 respectively. Thereafter, the SSL Virtual-Service-Module 506 is terminated and removed from the graph, as shown in configuration 503. As a result, SSL Virtual-Service-Module service has been upgraded dynamically and the services being provided originally by SSL Virtual-Service-Module 506 is not disrupted.

When the upgrade is aborted, the system directs all the new flow data to the old SSL Virtual-Service-Module version I 506. The system disconnects the edges 509 and 510. This takes the virtual rack to its original state before the upgrade was started. All the flows that started going through the SSL Virtual-Service-Module 508 are terminated by the system. The old flows that were going through the SSL Virtual-Service-Module version I 506 will continue to go through without any change.

Figure 5B:
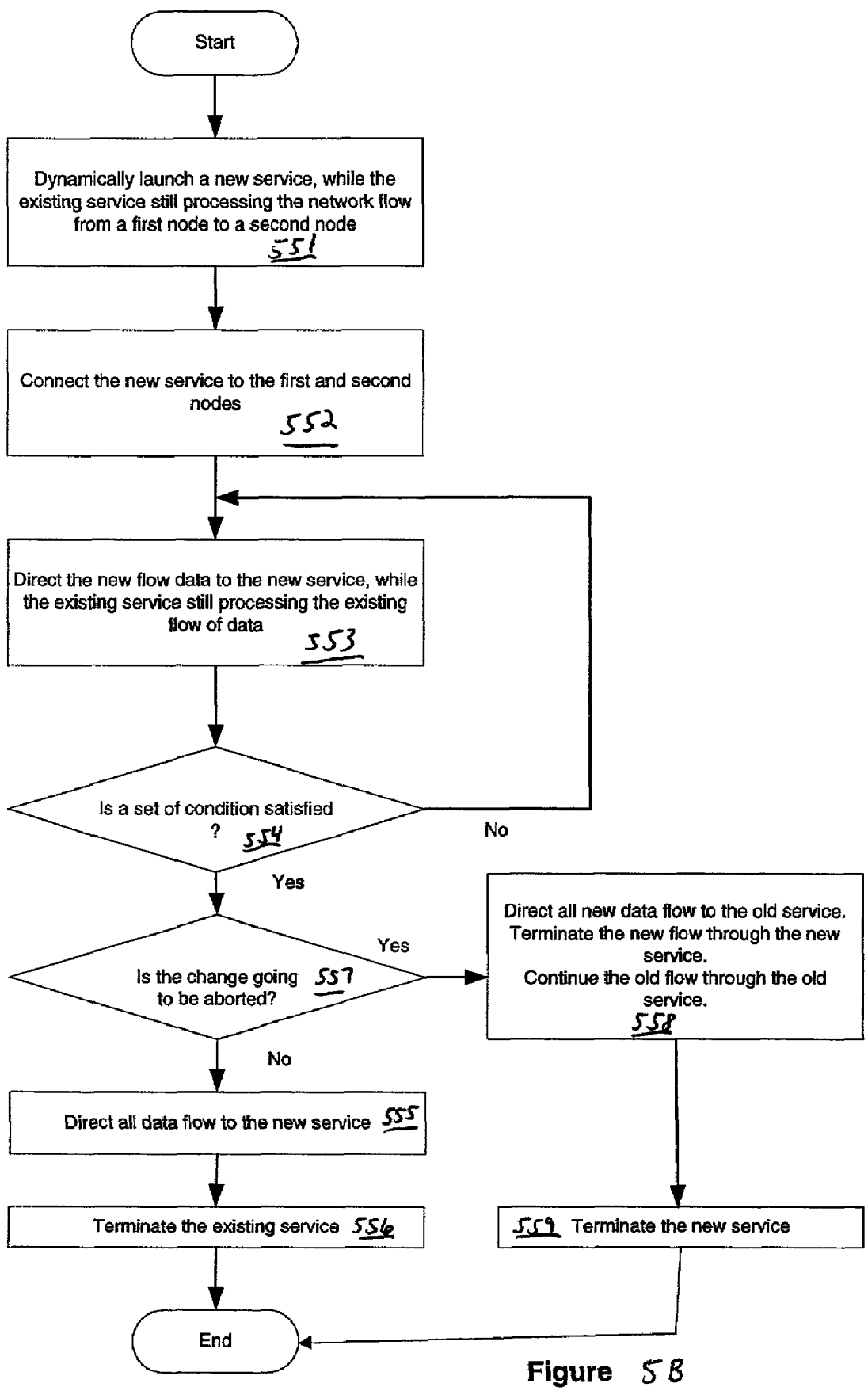
FIG. 5B shows a flowchart illustrating an exemplary method of upgrading a Virtual-Service-Module according to an embodiment of the invention.

FIG. 5B shows a flowchart illustrating an exemplary method of upgrading a Virtual-Service-Module according to an embodiment of the invention. In one embodiment, the method illustrates processing a request for changing a first node having a first service connecting with a second node and a third node in a network environment. The method includes dynamically launching a second service at the first node, connecting the second service with the second and the third nodes, directing requests for service to the second service, and terminating the first service. In an alternative embodiment, the method further includes determining whether the requests for service come from a new session of data, transmitting the requests for service to the second service if the requests for service come from a new session of data, and transmitting the requests for service to the first service if the requests for service come from an existing session of data.

Referring to FIG. 5B, when an upgrade request is received, at block 551, the system dynamically launches a new service (e.g., an instance of a Virtual-Service-Module with upgraded version), while the existing service (e.g., the existing Virtual-Service-Module needed to be upgraded) still processing the data flow from a first node to a second node. At block 552, the system connects the new Virtual-Service-Module to the first and second nodes. At block 553, the system then directs the new flow of data to the new Virtual-Service-Module, while directing the existing flow of data to the existing Virtual-Service-Module for processing. Thus the new and existing flows of data are processed in parallel by the new and existing Virtual-Service-Modules respectively. At block 554, the system checks whether a pre-specified condition has been satisfied. In one embodiment, the condition may be an amount of existing flow of data remains to be processed. In an alternative embodiment, the condition may be a period of time remained. Other conditions may be utilized. The parallel processes continue until the condition is satisfied. Once the condition is satisfied, at block 555, the system directs all data flows to the new Virtual-Service-Module and terminates the existing Virtual-Service-Module at block 556.

Thus, a new instance of the service module having different functionality than the existing instance of the service module may load during program execution, specifically, long after the initial start-up phase. The new instance of the service module to mirror the network routing path of the existing instance during the installation of the new instance so that the addition of functionality without causing downtime for any other components.

In an embodiment, in block 557 the system checks to see if the change is aborted. In block 558, if the change is aborted then the system directs all new data flow to the old service. The system terminates the new flow through the new service. Also the system continues the old flow through the old service. In block 559, the system then terminates the new service.

Figure 6A:
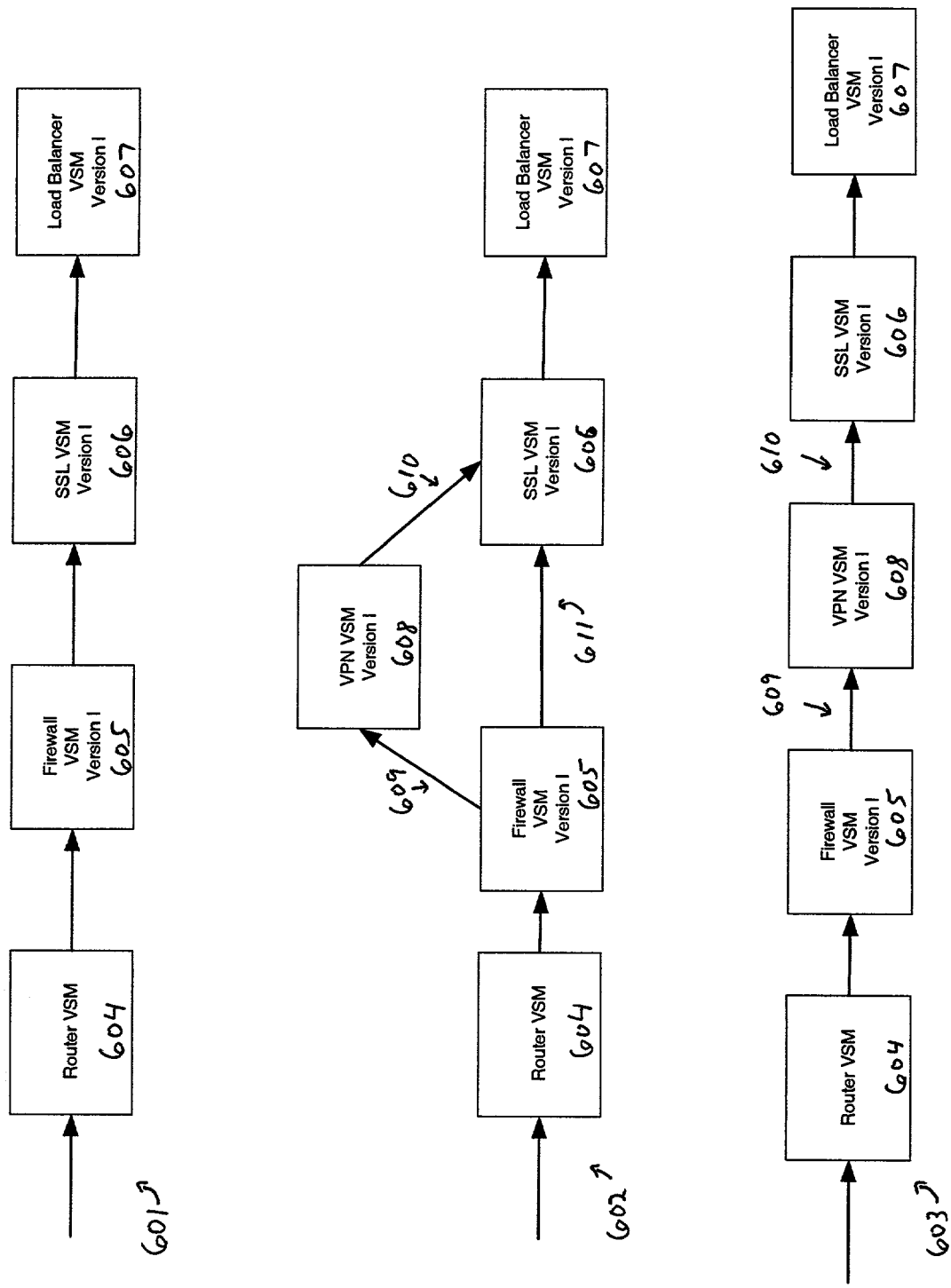
FIG. 6A shows an exemplary block diagram illustrating changes of a topology of a virtual network system according to an embodiment of the invention.

FIG. 6A shows an exemplary block diagram illustrating changes of a topology of a virtual network system according to an embodiment of the invention. Referring to FIG. 6A, in one embodiment, an initial configuration 601 of a topology processes a data flow through router VSM 604, a firewall VSM 605, a secure socket layer (SSL) VSM 606, and a load balancer VSM 607. When a change request (e.g., adding a VPN VSM to the graph) is received (e.g., through a user interface of the management virtual rack), an instance of VPN VSM 608 is launched. Once the VPN VSM 608 is launched, the system connect the VPN VSM 608 to the firewall VSM 605 through the edge 609 and to the load balancer VSM 607 through the edge 610. Thus, the VPN VSM 608 and the edge 611 connecting VSM 606 and VSM 605 are running in parallel, as shown in configuration 602.

The system then directs any new flow data to the newly executed VPN VSM 608. The VPN VSM 608 processes the new data flow and transmits the data to the SSL VSM 606 thereafter. At the mean while, the system continues direct the existing data flow to the SSL VSM 606 through the edge

611. This parallel processing continues until certain conditions are satisfied. In one embodiment, the condition may be a pre-specified amount data of existing flow waiting processing. In an alternative embodiment, the condition may be a pre-specified period of time.

In an embodiment, the change of the topology can be aborted anytime before the conditions to commit are satisfied. If the conditions are not met first, the configuration looks like 603. If the change is aborted before the conditions are met, it is reverted back to the original configuration 601.

Once the conditions are satisfied, the system directs all of the traffic to the new VPN VSM 608. Once system clears all old related packets of flow from the VPN VSM 608, the system disconnects the edges 611 between the SSL VSM 606 and the firewall VSM 605. As a result, VPN VSM service has been added to the graph dynamically and the services being provided originally by the edge 611 is not disrupted.

If the change is aborted, the system directs all of the new flow data to SSL Virtual-Service-Module 606 through the edge 611. The system terminates any flow going through the edge 609, the VPN Virtual-Service-Module 608, and the edge 610. The system continues to direct the existing data flow to the SSL VSM 606 through the edge 611. The system disconnects the edges 609 and 610, and the VPN Virtual-Service-Module 608. Thus restoring the original topology.

Figure 6B:
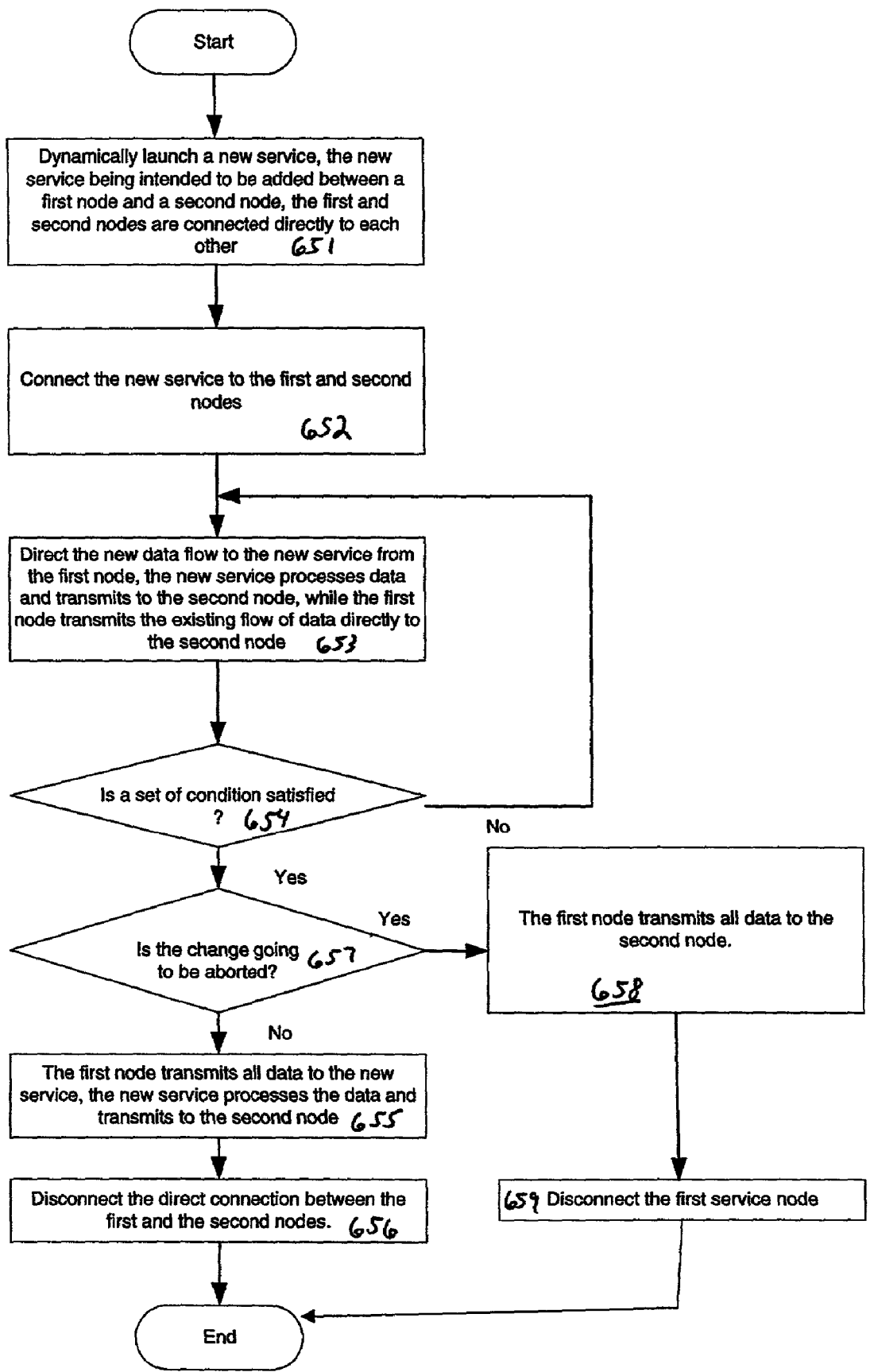
FIG. 6B shows a flowchart illustrating an exemplary method of changing a topology according to an embodiment of the invention.

FIG. 6B shows a flowchart illustrating an exemplary method of changing a topology according to an embodiment of the invention. In one embodiment, the method illustrates processing a request for changing a topology having a direct connection between a first node and a second node in a network environment. The method includes dynamically launching a new service, the service intended to be added between the first and second nodes, connecting the new service with the first and the second nodes, directing requests for service to the new service from the first node and thereafter transmit the requests to the second node, and terminating the direct connection between the first and second node. In an alternative embodiment, the method further includes determining whether the requests for service come from a new session of data, transmitting the requests for service to the new service if the requests for service come from a new session of data, and transmitting the requests for service to the direct connection between the first and second nodes if the requests for service come from an existing session of data.

Referring to FIG. 6B, when request is received, at block 651, the system dynamically launches a new service, the new service is intended to be added between a first node and a second node, the first and the second nodes are connected directly to each other through an edge. After the new service has been launched, at block 652, the system connects the new service to the first and the second nodes. The system then directs the new data flow to the new service from the first node, the new service processes new data flow and transmits the data to the second node.

At the mean while, the first node continue to transmit the existing data flow to the second node directly through the edge directly connecting with the first and the second nodes. These parallel processing continues until certain conditions are satisfied checked by the system at block 654. If the conditions are satisfied, at block 655 the system instructs the first node transmit all data flows to the new service, the new service processes the data and transmits to the second node. Once the new service is up and running, at block 656, the system disconnects the edge directly connecting the first and the second nodes.

In an embodiment, in block 657 the system checks to see if the change is aborted. In block 658, if the change is aborted then the system causes the first node to transmit all data to the second node. In block 659, the system then disconnects the first service node.

Figure 7A:
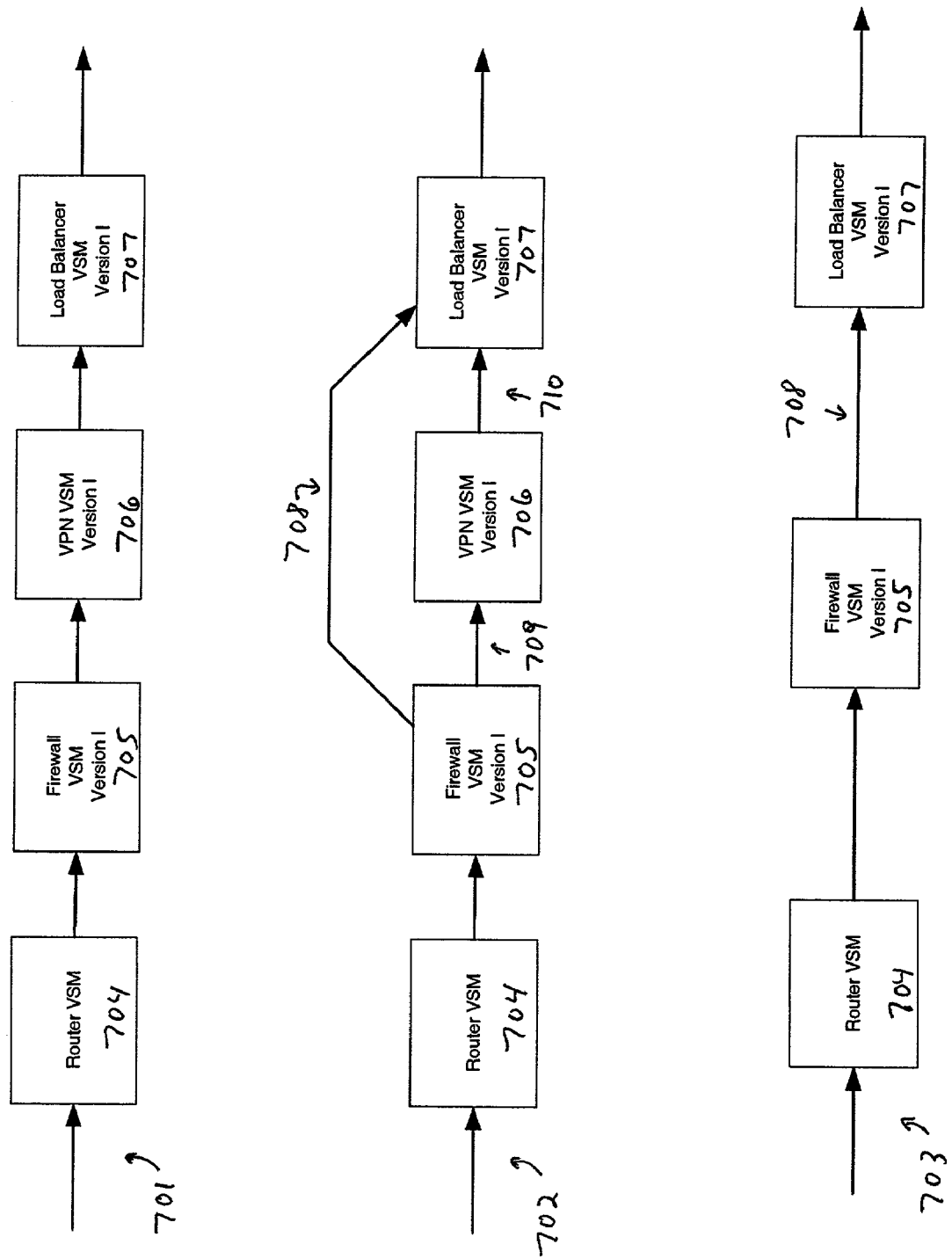
FIG. 7A shows an exemplary block diagram illustrating changes of a topology of a virtual network system according to an embodiment of the invention.
Figure 7:
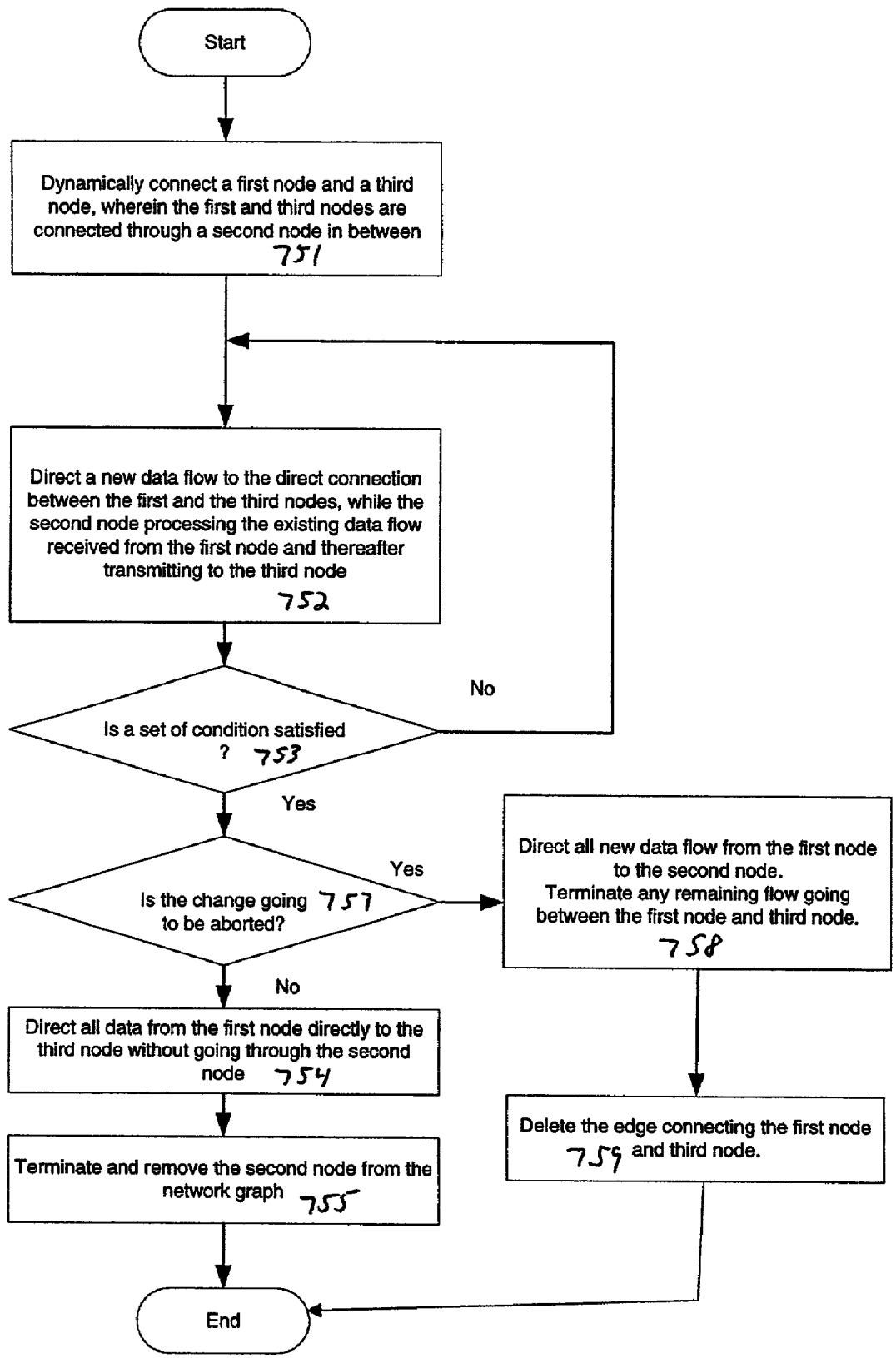
FIG. 7B shows a flowchart illustrating an exemplary method of changing a topology according to an embodiment of the invention.

FIG. 7A shows an exemplary block diagram illustrating changes of a topology of a virtual network system according to an embodiment of the invention. Referring to FIG. 7A, in one embodiment, an initial configuration 701 of a topology processes a data flow through router VSM 704, a firewall VSM 705, a VPN VSM 706, and a load balancer VSM 707. When a change request (e.g., deleting the VPN VSM 706 from the graph) is received (e.g., through a user interface of the management virtual rack), an edge 708 is created to connect the firewall VSM 705 and the load balancer VSM 707.

Once the edge 708 is created and connected, the system instructs the firewall VSM 705 to transmit any new data flow to the load balancer VSM 707 directly through the edge 708, while the existing data flow is transmitted by the firewall VSM 705 to the load balancer VSM 707 through the VPN VSM 706. Thus, the edge 708 and the VPN VSM 706 are running in parallel, as shown in configuration 602. This parallel processing continues until certain conditions are satisfied. In one embodiment, the condition may be a pre-specified amount data of existing flow waiting processing. In an alternative embodiment, the condition may be a pre-specified period of time.

In an embodiment, as described above, if a change is aborted redirects the new flow of data packets and continues the existing flow of data packets.

Once the conditions are satisfied, the system directs all of the traffics from the firewall VSM 705 directly to the load balancer VSM 707 through the edge 708. Once the data processing of the edge 708 stabilizes, the system disconnects the edges 709 and 710 between the VPN VSM 706 and the firewall VSM 705 and the load balancer VSM 707. Thereafter, the VPN VSM 706 is terminated and removed from the graph. As a result, VPN VSM service has been deleted from the graph dynamically and the services being provided originally by the VPN VSM 706 is not disrupted.

FIG. 7B shows a flowchart illustrating an exemplary method of changing a topology according to an embodiment of the invention. In one embodiment, the method illustrates processing a request for changing a topology having a first node, a second node, and a third node, the first node being directly connected to the second node and the second node being directly connected to the third node. The method includes dynamically connecting the first and third nodes, directing requests for service directly from the first node to the second node, and terminating the second node. In an alternative embodiment, the method further includes determining whether the requests for service come from a new session of data, transmitting the requests for service directly from the first node to the second node, if the requests for service come from a new session of data, and transmitting the requests for service from the first node to the second node and from second node to the third node, if the requests for service come from an existing session of data.

Referring to FIG. 7B, when request is received, at block 751, the system dynamically connects a first node and a third node, wherein the first and the third node are connect through a second node in between. Once the connection between the first and the third nodes are created, at block 752, the system directs the new data flow to the direct connection between the first and third nodes. At the mean while, the second node is still processing the existing data flow received from the first node and thereafter transmitting the data to the third node. This parallel processing continues until a set of conditions is satisfied at block 753. Upon which, at block 754, the system directs all data flows from the first node directly to the third node without going through the second node. At block 755, the second node is terminated and removed from the graph, since it is no longer needed.

In an embodiment, in block 757 the system checks to see if the change is aborted. In block 758, if the change is aborted then the system directs all the new data flow from the first node to the second node. Also, the system terminates any remaining flow going between the first node and third node. In block 759, the system deletes the edge connecting the first node and third node.

In one embodiment, the software used to facilitate the algorithms can be embodied onto a computer-readable medium. A computer-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. The invention is to be understood as not limited by the specific embodiments described herein, but only by scope of the appended claims.

We claim:

1. An apparatus, comprising:
a service module modeled to represent a network element that performs one or more functions to process a packet in a network system, the service module embedded in a container program, the service module being a self-contained module of data and its associated processing software that has an archive file containing both executable code as well as metadata that integrates the service module with the network system, wherein a first instance of the service module is configurable to model a first network element and a second instance of the service module is configurable to model a second network element different in function than the first network element.

2. The apparatus of claim 1, wherein the service module comprises a high-level abstraction composed of multiple sub-components, the sub-components include:
a management component to interface with components internal to a virtual network graph;
a packet-processing component to determine a path of a packet through the virtual network graph; and
a flow set-up component to process packets beyond what instructions in the packet-processing component can accomplish.

3. The apparatus of claim 1, wherein the service module belongs to an object class and one or more instances of the service module exist, a first instance of the service module having different versioning information than a second instance of the service module.

4. The apparatus of claim 1, wherein the network element is one of a group consisting of a router, an Ethernet switch, a virtual private network, a firewall, a load balancer, a bridge, and a network address translator.

5. The apparatus of claim 1, wherein the meta data includes information that describes the various configuration parameters supported by the service module and any specific commands required to configure the service module through a command-line interface.

6. The apparatus of claim 1, wherein the container program to provide a common environment for a first service module to interact with a second service module.

7. The apparatus of claim 1, wherein the container program comprises an operating system.

8. The apparatus of claim 1, further comprising:
a first service module embeds in the container program;
a second service module embeds in the container program, the second service module to communicate information with the first service module via the container program without a direct object reference to the first service module.

9. The apparatus of claim 1, wherein the executable code to include instructions to install and remove the service module, as well as instructions to configure the service module with configuration information.

10. The apparatus of claim 1, wherein the service module is mapped to physical processing power and memory capacity dedicated to that service module.

11. The apparatus of claim 1, wherein the service module is contained in a computer readable medium.

12. The apparatus of claim 1, further comprising:
a physical layer in the network system, the physical layer having processing power and memory space dedicated to the service module.

13. A network system, comprising:
a virtual graph composed of a plurality individual networks;

a first individual network associated with a first user, the first individual network including a first plurality of service modules modeled to be representing a first set of network elements;

a second individual network associated with a second user, the second individual network including a second plurality of service modules modeled to be representing a second set of network elements, wherein the second set of network element differs in type of network elements included in the second individual network and topological order of the network elements in the second individual network than the first set of network elements wherein the first plurality of service modules includes a first service module embedded in a container program, the first service module being self contained module of data and its associated processing software that has an archive file containing both executable code as well as metadata that integrates the service module with the network system.

14. The network system of claim 13, wherein the first individual network has a unique virtual address space, dedicated processing power and dedicated memory to make the first individual network logically and physically distinct from the second individual network.

15. The network system of claim 14, wherein the dedicated processing power employs a token bucket algorithm.

16. The network system of claim 13, wherein the first plurality of service modules includes a first service module, the network system to load, remove, configure or modify the first service module during program execution without a packet flow disruption.

17. The network system of claim 13, wherein the virtual graph composed of a plurality individual networks is hosted on a single computing machine.

18. The network system of claim 17, wherein the first individual network associated with the first user also includes a physical network element external to the single computing machine.

19. The network system of claim 13, wherein the virtual graph composed of a plurality individual networks is hosted on a multiple computing machines connected by a network.

20. The network system of claim 19, wherein the first individual network associated with the first user also includes a physical network element external to the network connecting the multiple computing machines.

* * * * *